United States Patent
Baek et al.

(10) Patent No.: US 12,108,739 B2
(45) Date of Patent: Oct. 8, 2024

(54) DATA COLLECTION APPARATUS FOR SEA CREATURES

(71) Applicant: Korea Institute of Ocean Science & Technology, Busan (KR)

(72) Inventors: Seung Jae Baek, Busan (KR); Sung Yong Oh, Busan (KR); Yong Jae Kim, Busan (KR)

(73) Assignee: Korea Institute of Ocean Science & Technology, Busan (KR)

( * ) Notice: Subject to any disclaimer, the term of this patent is extended or adjusted under 35 U.S.C. 154(b) by 112 days.

(21) Appl. No.: 17/975,856

(22) Filed: Oct. 28, 2022

(65) Prior Publication Data

US 2024/0081286 A1 Mar. 14, 2024

(30) Foreign Application Priority Data

Sep. 14, 2022 (KR) .......................... 10-2022-0115860

(51) Int. Cl.
*A01K 11/00* (2006.01)
(52) U.S. Cl.
CPC .................................. *A01K 11/008* (2013.01)
(58) Field of Classification Search
CPC ............................ A01K 11/008; A01K 11/006
See application file for complete search history.

(56) References Cited

U.S. PATENT DOCUMENTS

| 6,050,225 | A * | 4/2000 | Stamps | A01K 11/004 |
| | | | | 342/51 |
| 6,332,432 | B1 * | 12/2001 | Marshall | A01K 61/90 |
| | | | | 119/859 |
| 7,380,453 | B1 * | 6/2008 | Van Every | G01C 13/00 |
| | | | | 73/170.29 |
| 2002/0100425 | A1 * | 8/2002 | Meyers | A01K 11/008 |
| | | | | 119/174 |
| 2012/0206296 | A1 * | 8/2012 | Wan | G01S 19/34 |
| | | | | 342/357.31 |
| 2016/0357238 | A1 * | 12/2016 | Shafer | G16H 40/67 |
| 2018/0082166 | A1 * | 3/2018 | Kukulya | G01S 7/521 |
| 2019/0230901 | A1 * | 8/2019 | Mooneyham | A01K 11/008 |

FOREIGN PATENT DOCUMENTS

| KR | 2012/0034532 A | 4/2012 |
| KR | 2020/0078762 A | 7/2020 |

* cited by examiner

*Primary Examiner* — Andrew W Bee
(74) *Attorney, Agent, or Firm* — Cesari & McKenna, LLP

(57) ABSTRACT

Disclosed is a data collection apparatus for sea creatures including a main body, an antenna, a battery case and a separation unit. The main body includes a sensor assembly configured to collect information about surroundings of a target creature to be recorded, and a battery coupler formed at one side of the main body. The antenna protrudes in one direction from the main body so as to send data to outside. The battery case has a male connector configured such that at least a part thereof is accommodated in the battery coupler so as to be rotatably coupled thereto, and a battery installed in the battery case so as to supply electrical energy to the main body. The separation unit is detachably coupled to the battery case, and is fixed to the target creature to be recorded.

9 Claims, 7 Drawing Sheets

DATA COLLECTION APPARATUS FOR SEA CREATURES

CROSS-REFERENCE TO RELATED APPLICATIONS

This application claims priority to Korean Application No. 10-2022-0115860, filed on Sep. 14, 2022. The content of the prior application is hereby incorporated herein by reference in its entirety.

BACKGROUND OF THE INVENTION

Field of the Invention

The present disclosure relates to an apparatus which collects information about sea creatures, and more particularly, to a data collection apparatus which is mounted on a sea creature so as to collect information about changes in the position of the sea creature and a surrounding environment.

Description of the Related Art

In general, each living organism has unique habits and growth pattern depending on the kind thereof. In order to acquire information amount the living organism, it is necessary to closely monitor the living organism for a designated period of time or more.

As data communication and location tracking technologies are being developed, information about a living organism may be acquired using a tag which collects specific data and sends the position of the living organism.

Particularly, in order to research the living habits or living environments of wild animals, a very long time and a lot of manpower are required. Further, people participating in the research should include professionals in various fields.

There are great restrictions on human activities in the sea. Therefore, it is more difficult to acquire information about sea creatures inhabiting the sea, as compared to land creatures.

Korean Patent Laid-open Publication No. 10-2012-0034532 (hereinafter, referred to as 'Related Art Document') entitled "Traceability system using radio frequency identification (RFID) chip of fish" discloses technology for acquiring information about the position of a sea creature or a surrounding environment.

In the Related Art Document, an RFID microchip as a unit for tracing a fish or a wild animal is inserted into a target creature. Further, the moving route of the target creature within a predetermined range and information about the dormant state, feed intake, spawning, etc. of the target creature are acquired.

However, in the Related Art Document, the target creature should be within a designated range from a reader, which is separately installed, and thus, there are restrictions on the target creature.

Further, it is difficult to acquire various pieces of information about sea creatures and the deep sea in which the sea creatures live.

RELATED ART DOCUMENT

Patent Document (Patent Document 1) Korean Patent Laid-open Publication No. 10-2012-0034532 (Publication Date: Apr. 12, 2012)

SUMMARY OF THE INVENTION

Therefore, the present disclosure has been made in view of the above problems, and it is an object of the present disclosure to provide a data collection apparatus for sea creatures which is attached to a sea creature so as to record the position and the moving route of the sea creature and to collect environmental information around the sea creature.

It is another object of the present disclosure to provide a data collection apparatus for sea creatures which solves a problem of a conventional data collection apparatus in that a battery is not reusable after the battery is discharged.

It is yet another object of the present disclosure to provide a data collection apparatus for sea creatures which solves conventional problems in that there is difficulty in assembling and disassembling a data collection apparatus and a separate tool is required.

It is still another object of the present disclosure to provide a data collection apparatus for sea creatures which solves a conventional problem in that it is difficult to acquire information about a sea creature even when the sea creature is out of a communicable range and moves to the sea floor.

It is still yet another object of the present disclosure to provide a data collection apparatus for sea creatures which solves a conventional problem in that it is difficult to acquire specific data even when a sea creature, to which a data collection apparatus is attached, is not captured again.

Additional advantages, objects, and features of the disclosure will be set forth in part in the description which follows and in part will become apparent to those having ordinary skill in the art upon examination of the following or may be learned from practice of the disclosure.

In accordance with the present disclosure, the above and other objects can be accomplished by the provision of a data collection apparatus for sea creatures, including a main body configured to have a sensor assembly configured to collect information about surroundings of a target creature to be recorded, and a battery coupler formed at one side of the main body, an antenna configured to protrude in one direction from the main body so as to send data to outside, a battery case configured to have a male connector configured such that at least a part thereof is accommodated in the battery coupler so as to be rotatably coupled thereto, and a battery installed in the battery case so as to supply electrical energy to the main body, and a separation unit detachably coupled to the battery case and fixed to the target creature to be recorded.

The main body may include a first body configured to have a first buoyant material and at least one water inlet formed, a second body configured, together with the first body, to accommodate a main board provided with a controller and the sensor assembly, and coupled to the first body so as to form a streamlined body, and a ring-shaped base coupled to one side of each of the first body and the second body so as to prevent the first body and the second body from being separated from each other, and configured to accommodate a connecting board connected to the main board.

The battery case may include an insert configured to serve as an inlet of an inner space of the battery case, and to have the male connector formed along an outer circumference of the insert, the battery accommodated in the battery case through the insert, a battery board coupled to the insert so as to be electrically connected to the battery and the controller, and a separation terminal formed at one end of the battery case opposite to the insert.

The battery board may include a first pogo pin connected to a first terminal of the battery, and a second pogo pin connected to a second terminal of the battery, and the first pogo pin and the second pogo pin may be electrically connected to the connecting board.

The separation terminal may include coupling holes formed as through holes, the battery board may include coupling fuses provided at positions thereof corresponding to the coupling holes, the data collection apparatus may further include a separation wire connected to the coupling fuses through the coupling holes in a state in which at least a part of the separation wire is coupled to the separation unit, and the separation wire may be separated from the coupling fuses depending on predetermined conditions.

The battery board may further include overvoltage generators configured to supply current to the coupling fuses when a predetermined signal is input from the controller, so as to separate the separation wire from the coupling fuses.

Buoyancies of the first buoyant material and the second buoyant material may be increased when the separation unit is separated from the battery case.

The main body may include a mount groove formed along outer circumferences of the first body and the second body so that a strap may be mounted in the mount groove, and at least one sensing apparatus may be coupled to the strap.

The separation unit may be separated from the battery case when there is no change in a position of the target creature to be recorded for a predetermined period of time.

The separation unit may be separated from the battery case when an amount of electrical energy stored in the battery is equal to or less than a predetermined value.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. In the following description of the embodiments, the same reference numbers will be used to refer to the same or like parts.

A data collection apparatus 40 for sea creatures according to one embodiment of the present disclosure collects information regarding a sea creature. Concretely, the data collection apparatus 40 according to one embodiment of the present disclosure is mounted on a moving target creature 30 to be recorded. The target creature 30 to be recorded may be a sea creature inhabiting the sea. Further, the data collection apparatus 40 may be applied to animals inhabiting areas other than the sea.

Figure 1:
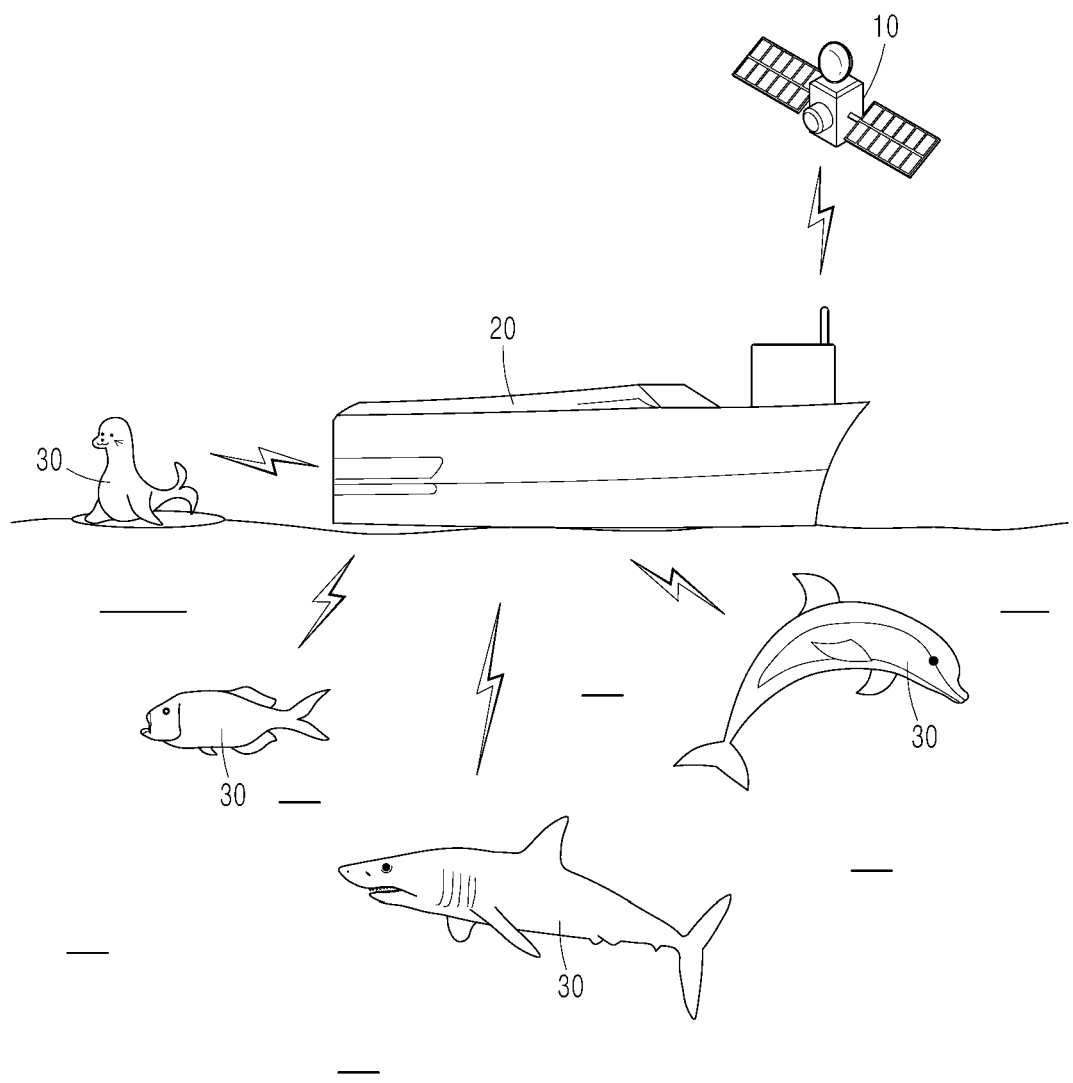
FIG. 1 is a state diagram showing the state in which a data collection apparatus for sea creatures according to one embodiment of the present disclosure is used.
Figure 2:
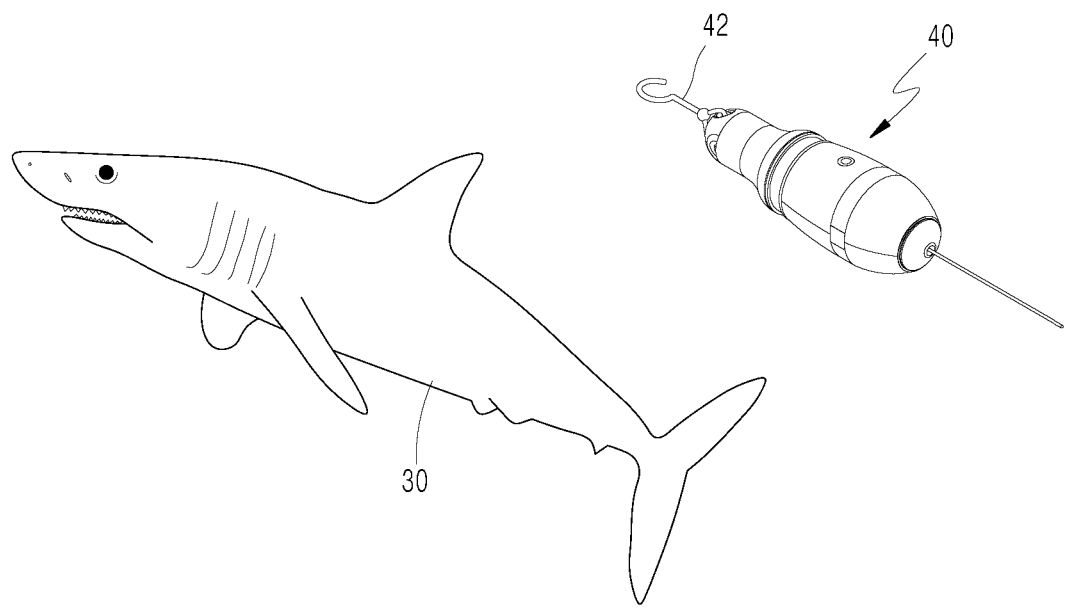
FIG. 2 is a view schematically illustrating the state in which the data collection apparatus according to one embodiment of the present disclosure is mounted on a target creature to be recorded.

FIG. 1 is a state diagram showing the state in which the data collection apparatus 40 according to one embodiment of the present disclosure is used, and FIG. 2 is a view schematically illustrating the state in which the data collection apparatus 40 according to one embodiment of the present disclosure is mounted on the target creature 30 to be recorded.

As shown in FIG. 1, in the data collection apparatus 40 according to one embodiment of the present disclosure, various sea creatures, such as a seal, a shark, a dolphin, a fish, etc., may be used as the target creature 30 to be recorded.

The target creature 30 to be recorded may be an individual which lives close to the water surface or inhabits on the water surface. Further, the target creature 30 to be recorded may include an individual which inhabits in the deep sea.

The data collection apparatus 40 according to one embodiment of the present disclosure is coupled to the body of the target creature 30 to be recorded, which is captured. The data collection apparatus 40 may communicate with a satellite 10 or a relay station 20 in the state in which the data collection apparatus 40 is coupled to the target object 30 to be recorded. Alternatively, the data collection apparatus 40 may include a storage, which is a separate data storage space, and may store collected data in the storage. The storage may be included in a controller 510.

As shown in FIG. 2, the data collection apparatus 40 may be fixed to the target creature 30 to be recorded by fastening a hook 42 to the target creature 30 to be recorded. Otherwise, the data collection apparatus 40 may be tied or adhered to the body of the target creature 30 to be recorded so as to be fixed.

Figure 3:
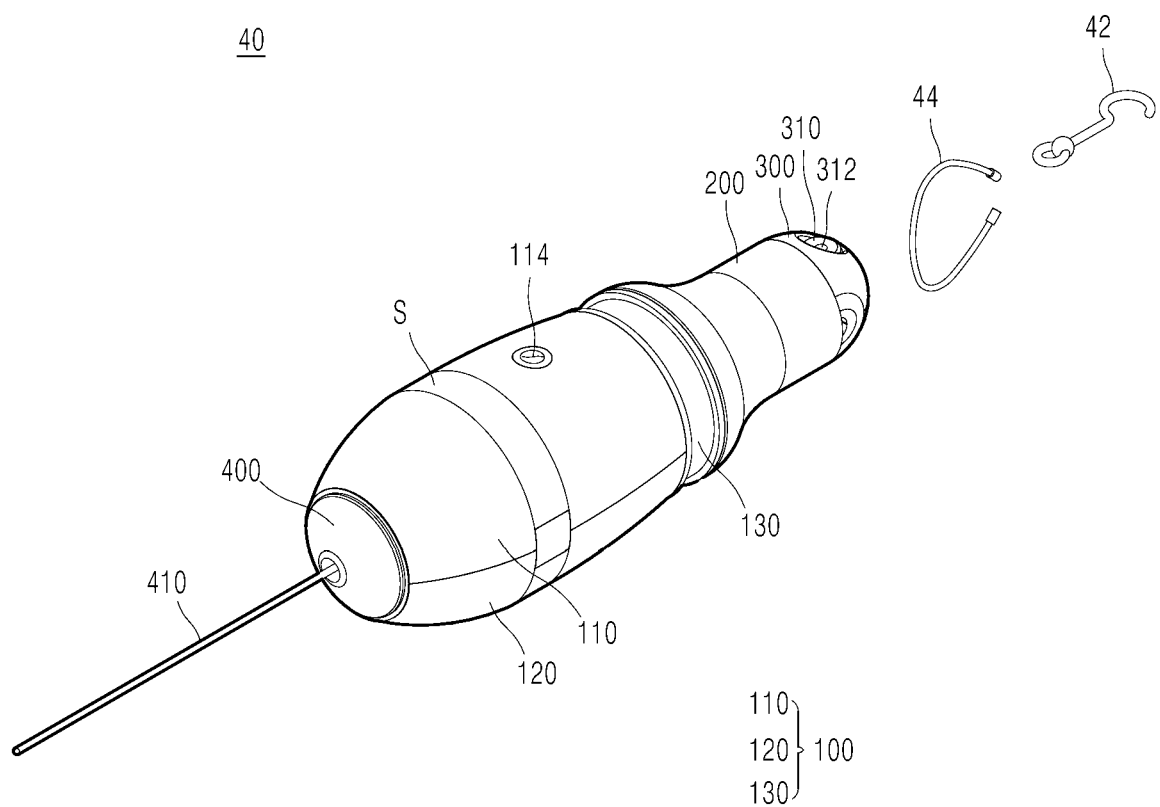
FIG. 3 is a perspective view showing the data collection apparatus according to one embodiment of the present disclosure.
Figure 4:
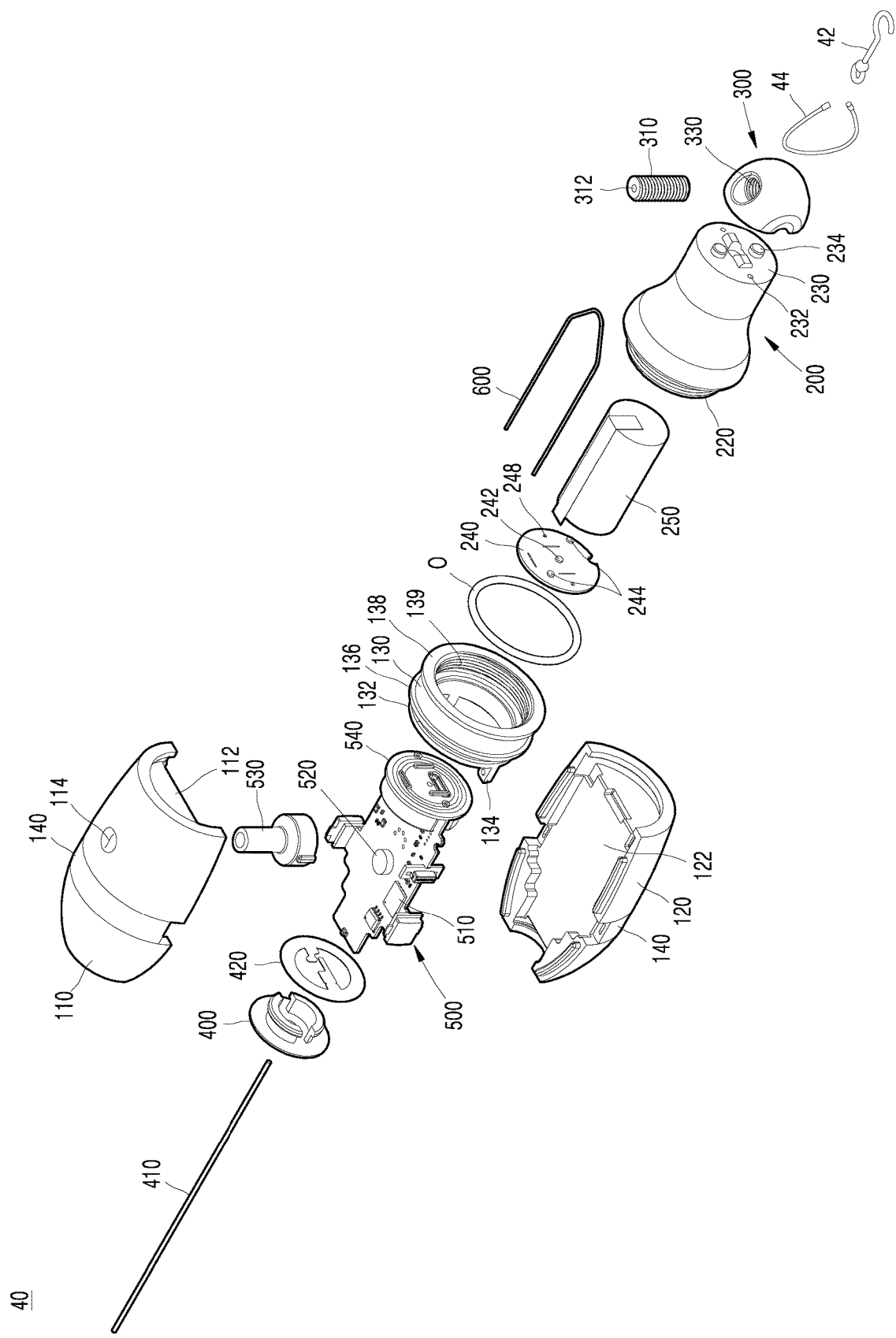
FIG. 4 is an exploded perspective view showing the data collection apparatus according to one embodiment of the present disclosure.

FIG. 3 is a perspective view showing the data collection apparatus 40 according to one embodiment of the present disclosure, and FIG. 4 is an exploded perspective view showing the data collection apparatus 40 according to one embodiment of the present disclosure.

As shown in FIGS. 3 and 4, the data collection apparatus 40 according to one embodiment of the present disclosure includes a main body 100, an antenna 410, a battery case 200, and a separation unit 300. The main body 100 includes a sensor assembly 520 configured to collect information about surroundings of the target creature 30 to be recorded, and a battery coupler 138 is formed at one side of the main body 100. The antenna 410 protrudes in one direction from the main body 100, and sends data to the outside. The battery case 200 has a male connector 220, at least a part of which is accommodated in the battery coupler 138 so as to be rotatably coupled thereto, and a battery 250 configured to supply electric energy to the main body 100 is installed in the battery case 200. The separation unit 300 is detachably coupled to the battery case 200. Further, the separation unit 300 is fixed to the target creature 30 to be recorded.

The main body 100 is a streamlined enclosure. The main body 100 is formed by coupling a first body 110, a second body 120 and a base 130. The first body 110 and the second body 120 overlap each other, and a main board 500 is accommodated in a designated space formed by the first body 110 and the second body 120. The main board 500 includes the controller 510, the sensor assembly 520, and a transceiver. The sensor assembly 520 may sense information, such as water pressure, water temperature, water quality, position, speed, etc. The sensor assembly 520 may be provided in a water input cover 530, and the water input cover 530 enables ambient sea water to flow into the sensor assembly 520 through a water inlet 114 formed in the first body 110.

A first buoyant material 112 is provided in the first body 110. A second buoyant material 122 is provided in the second body 120. The magnitudes of buoyancies of the first buoyant material 112 and the second buoyant material 122 may be adjusted by the controller 510.

A mount groove 140 may be continuously formed in the outer circumferences of the first body 110 and the second body 120. A strap S may be coupled to the mount groove 140, and the strap S may serve to more firmly couple the first body 110 and the second body 120 to each other and to enable a camera, a lighting apparatus, an additional sensing apparatus, etc., which are fixed to the strap S, to be installed on the main body 100.

The antenna 410 is connected to one side of the main body 100 opposite to the other side of the main body 100, to which the battery case 200 is coupled. The antenna 410 is connected to the main board 500, and protrudes from one side of the main body 100 to a great length. The antenna 410 may send predetermined data to the outside.

Further, the controller 510 of the main board 500 may receive a series of data from equipment, such as the relay station 20 or the satellite 10, through the antenna 410.

The antenna 410 may be coupled to the main body 100 through a cover 400 coupled to the main body 100, and the cover 400 is provided at the position of the main body 100 opposite to the base 130.

A blocking plate 420 is coupled to the inner surface of the cover 400 coupled to the first body 110 and the second body 120.

That is, the blocking plate 420 prevents the sea water from flowing into the main body 100 through a gap between the cover 400 and the main body 100 or between the antenna 410 and the cover 400.

Figure 5:
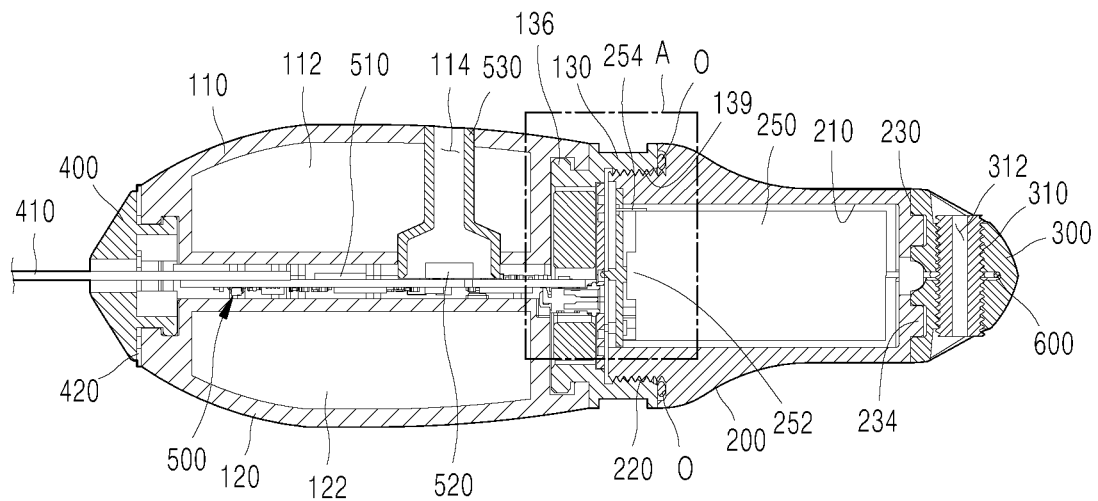
FIG. 5 is a longitudinal-sectional view showing the data collection apparatus according to one embodiment of the present disclosure.
Figure 6:
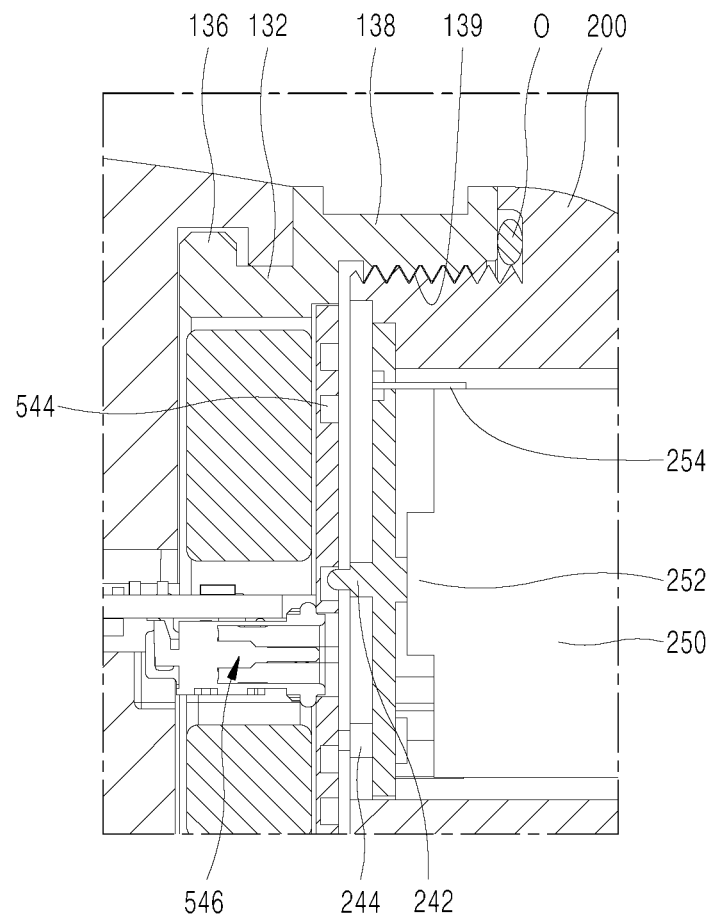
FIG. 6 is an enlarged view of portion A of FIG. 5.

FIG. 5 is a longitudinal-sectional view showing the data collection apparatus 40 according to one embodiment of the present disclosure, and FIG. 6 is an enlarged view of portion A of FIG. 5.

As shown in FIGS. 4 to 6, the base 130 is coupled to one side of each of the first body 110 and the second body 120 so as to prevent the first body 110 and the second body 120 from being separated from each other. The base 130 is formed as a ring-shaped rim, a body coupler 132 is formed at one end of the base 130, and the battery coupler 138 is formed at the other end of the base 130.

The body coupler 132 and the battery coupler 138 are formed opposite to each other. The body coupler 132 includes a plurality of coupling pins 134, and a coupling protrusion 136 protruding outwards from the outer circumferential surface of one end of the body coupler 132. The coupling pins 134 may be coupled to one end of each of the first body 110 and the second body 120, and the first body 110 and the second body 120 may be engaged with the coupling protrusion 136 of the base 130.

A connecting board 540 connected to the main board 500 may be accommodated in the base 130. The connecting board 540 may have terminals connected to the battery 250, and a data terminal 546 configured to transmit and receive data.

The data terminal 546 may be formed as a C-type connector.

The terminals connected to the battery 250 may include a central terminal 542 formed at the center of the disc-shaped connecting board 540, and circular terminals 544 disposed in a circular shape having a designated diameter about the central terminal 542. Here, a plurality of circular terminals 544 may be formed.

A female connector 139 may be formed on the inner circumferential surface of the battery coupler 138 of the base 130. The female connector 139 includes a screw thread for screw connection.

Figure 7:
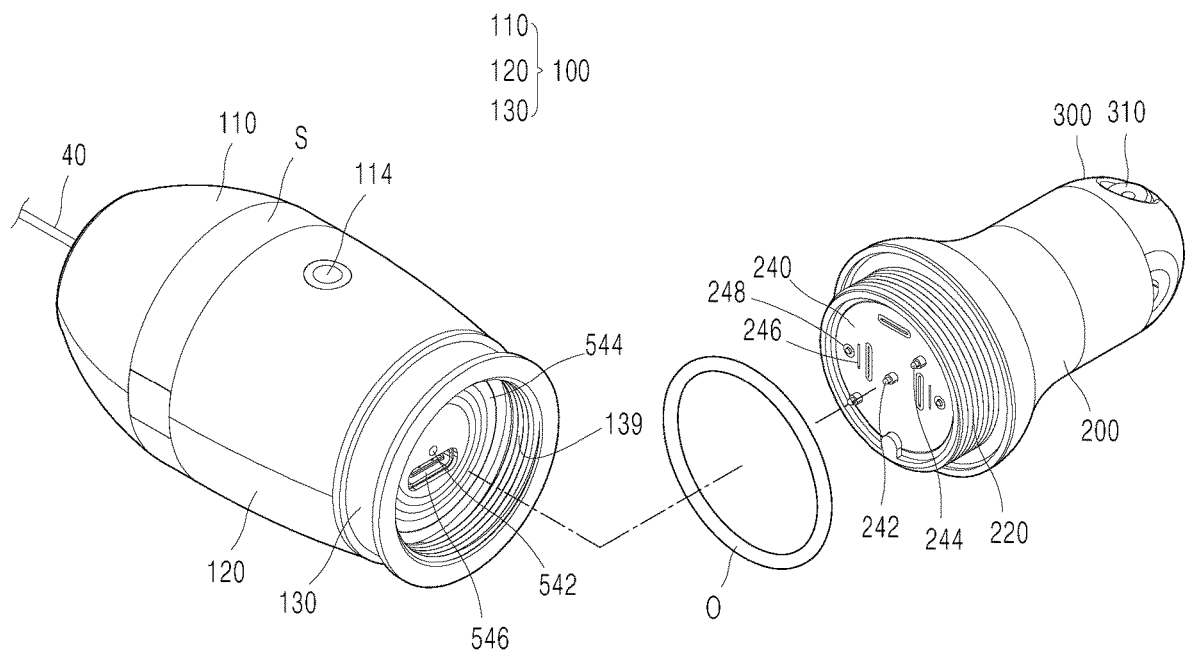
FIG. 7 is an exploded perspective view showing the state of the data collection apparatus according to one embodiment of the present disclosure, in which a body and a battery case are separated from each other.

FIG. 7 is an exploded perspective view showing the state of the data collection apparatus 40 according to one embodiment of the present disclosure, in which the body 100 and the battery case 200 are separated from each other.

As shown in FIG. 7, a part of the male connector 220 of the battery case 220 is accommodated in the female connector 139, and a screw thread formed on the outer circumferential surface of the male connector 220 and the screw thread formed on the inner circumferential surface of the female connector 139 are engaged with each other so that the male connector 220 and the female connector 139 are rotatably coupled to each other.

That is, the battery case 200 is coupled to the battery coupler 138 of the base 130.

The battery case 200 is an enclosure connected to the main body 100, and accommodates the battery 250 and a battery board 240 therein.

An O-ring O for sealing is interposed between the base 130 and the battery case 200.

That is, the O-ring O is coupled to a position at which the female connector 139 and the male connector 220 are coupled to each other.

Figure 8:
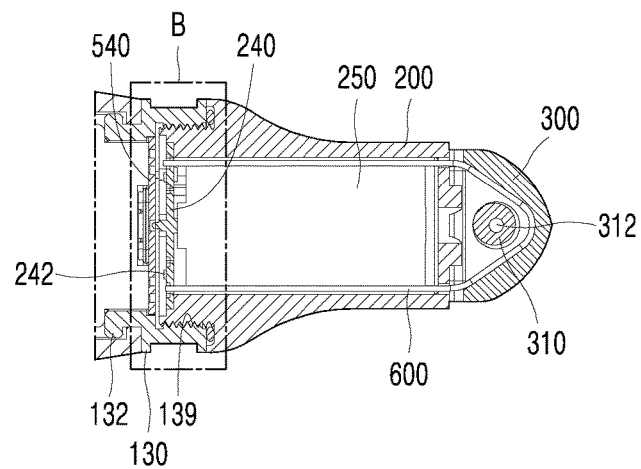
FIG. 8 is a transverse-sectional view showing the data collection apparatus according to one embodiment of the present disclosure.
Figure 9:
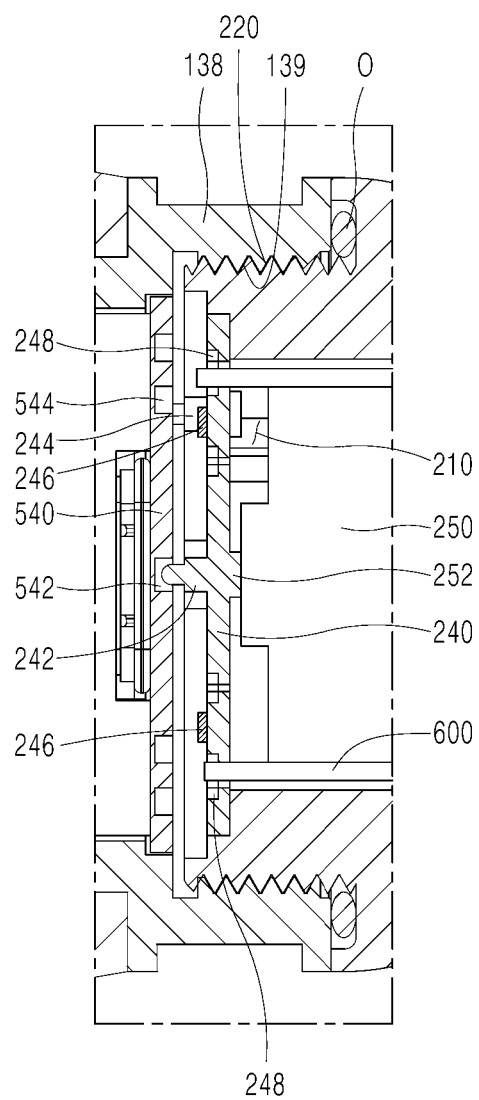
FIG. 9 is an enlarged view of portion B of FIG. 8.

FIG. 8 is a transverse-sectional view showing the data collection apparatus 40 according to one embodiment of the present disclosure, and FIG. 9 is an enlarged view of portion B of FIG. 8.

As shown in FIGS. 4, 8 and 9, one end of the battery case 200 is open, and an accommodation space is formed in the battery case 200. An inlet of the accommodation space serves as an insert 210, and the male connector 220 corresponding to the female connector 139 is provided on the outer circumferential surface of the insert 210.

The battery 250 is accommodated in the insert 210, and the battery board 240 coming into contact with the accommodated battery 250 is disposed in the insert 210 so as to cover the battery 250. Conduction terminals coming into contact with a first terminal 252 and a second terminal 254 of the battery 250 are provided on one surface of the battery board 240. A first pogo pin 242 and second pogo pins 244 are provided on the other surface of the battery board 240. The first pogo pin 242 is electrically connected to the first terminal 252 of the battery 250, and the second pogo pins 244 are electrically connected to the second terminal 254 of the battery 250.

The first pogo pin 242 and the second pogo pins 244 protrude towards the main body 100 in the state in which the battery board 240 is coupled to the insert 210 of the battery case 200. Further, the protruding lengths of the first pogo pin 242 and the second pogo pins 244 are decreased when external force is applied thereto, and the first pogo pin 242 and the second pogo pins 244 return to the original lengths thereof when the applied external force is removed. Therefore, the first pogo pin 242 and the second pogo pins 244 come into contact with the central terminal 542 and the circular terminals 544 of the connecting board 540 when the male connector 220 of the battery case 200 is coupled to the female connector 139 of the main body 100 through rotation.

Thereby, it is not necessary to manually connect electrical terminals of the battery 250 to the main board 500 one by one, and the terminals of the battery 250 may be electrically connected to the main board 500 simultaneously with connection of the battery case 200 to the main body 100 through rotation.

The first pogo pin 242 is formed at the center of the battery board 242 and comes into contact with the central terminal 542, and at least one second pogo pin 244 is formed at a position spaced apart from the central terminal 542 by a predetermined distance. In one embodiment of the present disclosure, a plurality of second pogo pins 244 may be provided.

The second pogo pins 244 come into contact with the circular terminals 544 so as to be electrically connected to the circular terminals 544, and, even when the battery board 240 is rotated and thus the positions of the second pogo pins 244 are moved, the second pogo pins 244 are moved along the circumferences of the circular terminals 544, and thus electrical connection between the second pogo pins 244 and the circular terminals 544 may be maintained.

Figure 10:
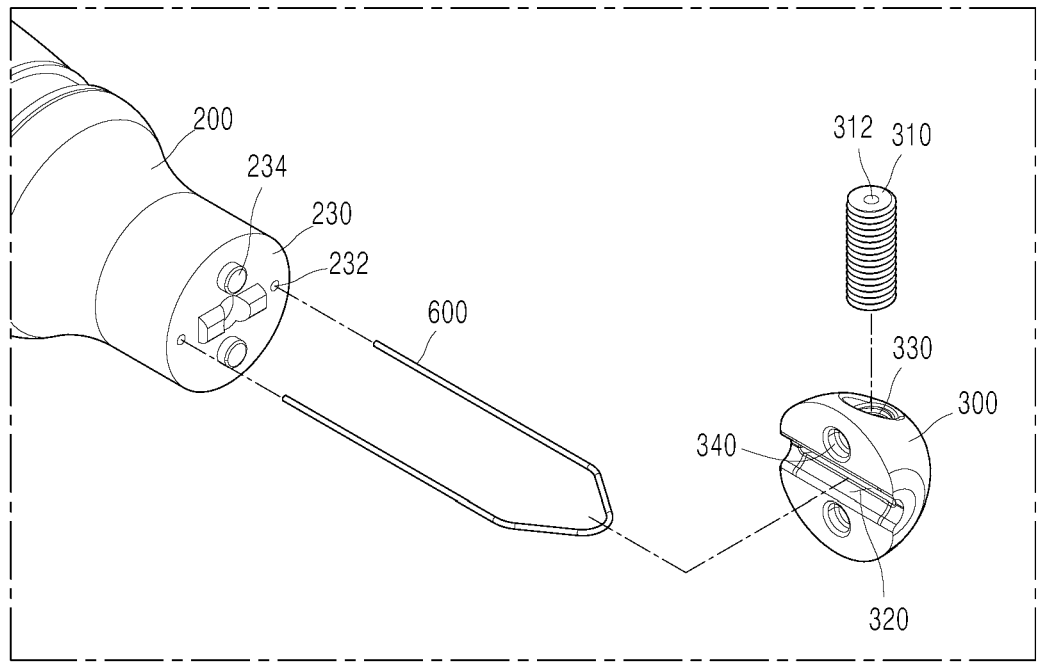
FIG. 10 is an exploded perspective view showing the state of the data collection apparatus according to one embodiment of the present disclosure, in which the battery case and a separation unit are separated from each other.

FIG. 10 is an exploded perspective view showing the state of the data collection apparatus 40 according to one embodiment of the present disclosure, in which the battery case 200 and the separation unit 300 are separated from each other.

As shown in FIG. 10, a separation terminal 230 is formed at the other side of the battery case 200 opposite to the insert 210. The separation unit 30 comes into contact with the separation terminal 230 so as to be coupled thereto, and has coupling holes 232 and guide protrusions 234.

A pair of coupling holes 232 is configured such that the coupling holes 232 are spaced apart from each other by a greater distance than the diameter of the battery 250 accommodated in the insert 210. Further, at least one guide protrusion 234 protrudes forwards from the separation terminal 230, and has a shape corresponding to a guide recess 340 formed in the separation unit 300 so as to be inserted into the guide recess 340.

A separation wire 600 passes through the coupling holes 232. The separation wire 600 is a linear member which is bent in a U shape, as shown in this figure.

The separation wire 600 is configured such that a pair of legs is disposed in parallel, and designated ends of the legs are bent in a semicircular shape or a rectangular shape so as to meet each other.

The other ends of the parallel legs of the separation wire 600 are respectively inserted into the two coupling holes 232, and are fixed to coupling fuses 248 provided on the battery board 240.

When current having a higher voltage than a predetermined value is applied to the coupling fuses 248, the separation wire 600 is separated from the coupling fuses 248.

The coupling fuses 248 are connected to overvoltage generators 246. The overvoltage generators 246 receive a command from the controller 510, and supply current having a predetermined voltage to the coupling fuses 248.

The controller 510 controls the overvoltage generators 246 so as to separate the ends of the legs of the separation wire 600 from the coupling fuses 248, in the case in which the data collection apparatus 40 according to one embodiment of the present disclosure is stopped beyond a predetermined time, in the case in which the state of charge of the battery 250 is reduced to a predetermined amount or less, and in the case in which a predetermined signal from the relay station 20 or the satellite 10 is input.

That is, both parallel legs of the separation wire 600 are respectively inserted into the coupling holes 232, pass through the inner space of the battery case 200, and are coupled to the battery board 240. The middle part of the separation wire 600 has a ring shape, and protrudes forwards from the separation terminal 230.

The separation unit 300 comes into contact with the separation terminal 230 so as to be coupled thereto. The guide protrusions 234 formed on the separation terminal 230 are inserted into the guide recesses 340 formed in the separation unit 300, thereby guiding the position of the separation terminal 230 so as to properly couple the separation terminal 230 to the separation unit 300. A long groove 320 is formed in a straight line having a length, which is equal to or greater than the distance between the coupling holes 232, in the surface of the separation unit 300 coming into contact with the separation terminal 230. The ring-shaped part of the separation wire 600, which protrudes forwards from the separation terminal 230, is inserted into the long groove 320.

The separation unit 300 includes a fixing hole 330 configured to vertically pass through the separation unit 300. The fixing hole 330 is formed to pass through the inside of the closed curve area of the separation wire 600 inserted into the long groove 320. A fixing bolt 310 is inserted into the fixing hole 330, and is coupled thereto.

Therefore, when the fixing bolt 310 is inserted into the fixing hole 330, the ring-shaped part of the separation wire 600 is coupled to the separation unit 300 through the fixing bolt 310.

That is, the separation unit 300 coming into contact with the separation terminal 230 is connected to the separation terminal 230 through the separation wire 600 and the fixing bolt 310.

An installation hole 312 is formed to pass through the center of the fixing bolt 310 in the length direction thereof. A wire 44 may pass through the installation hole 312, and the hook 42 may be coupled to the wire 44.

The ends of both legs of the separation wire 600 are fixed to the battery board 240 by the coupling fuses 248, and the ends of both legs of the separation wire 600 are separated from the coupling fuses 248 when the above-described predetermined conditions are satisfied.

In this case, the separation unit 300 and the separation wire 600 maintain the state of being coupled to the target creature 30 to be recorded through the hook 42, but the main body 100 and the battery case 200 are separated from the separation unit 300 so as to be free from the target creature 30 to be recorded.

Figure 11:
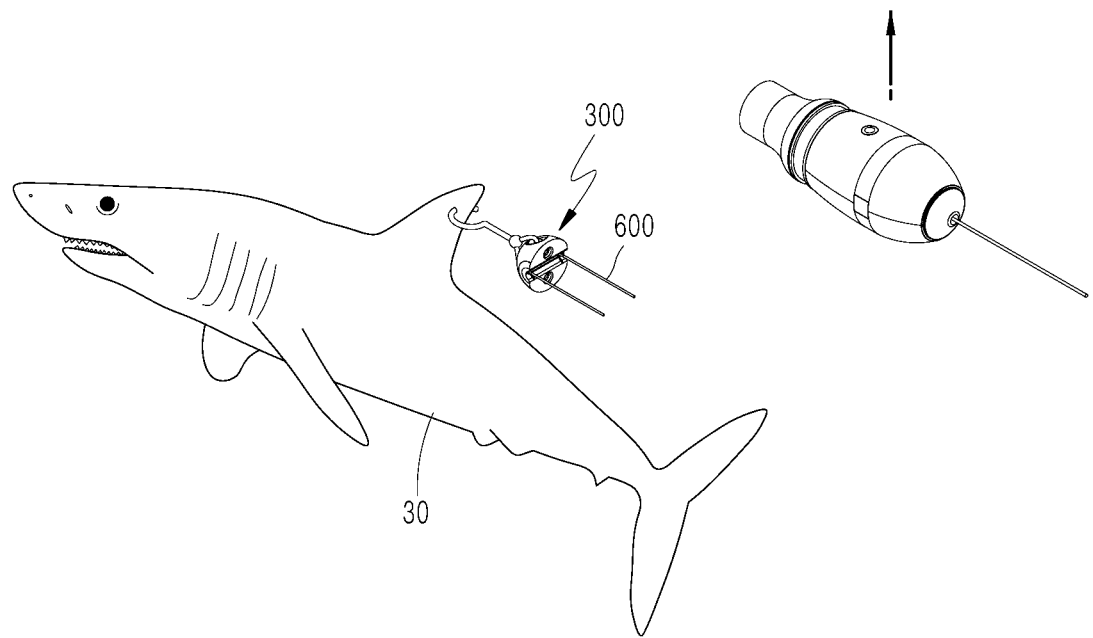
FIG. 11 is a state diagram showing the state in which the data collection apparatus according to one embodiment of the present disclosure is separated from the target creature to be recorded.

FIG. 11 is a state diagram showing the state in which the data collection apparatus 40 according to one embodiment of the present disclosure is separated from the target creature 30 to be recorded.

As shown in FIG. 11, the data collection apparatus 40 according to one embodiment of the present disclosure, from which the separation unit 300 is separated, is separated from the target creature 30 to be recorded, and rises to the sea surface.

The controller 510 may increase the buoyancies of the first buoyant material 112 and the second buoyant material 122, in the case in which the separation wire 600 is separated from the coupling fuses 248 by the overvoltage generators 246, i.e., in the case in which the separation unit 300 is separated from the battery case 200.

Thereby, the separated main body 100 and battery case 200 may be more rapidly moved to the sea surface.

As is apparent from the above description, a data collection apparatus for sea creatures according to the present disclosure may detect the position and the moving route of a sea creature, and may easily collect information about a surrounding environment around the sea creature.

The data collection apparatus according to the present disclosure may allow the principal part of the data collection apparatus to be retrieved even when the sea creature is not captured again.

The data collection apparatus according to the present disclosure may even collect data about a sea creature inhabiting an area in which communication is difficult.

The data collection apparatus according to the present disclosure facilitates replacement of a battery with a new one, and thus enables enough tests to be performed before the data collection apparatus is mounted on a target creature, and is reusable.

The data collection apparatus according to the present disclosure may be easily assembled and disassembled without any separate tool.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A data collection apparatus for sea creatures, comprising:
    a main body configured to have a sensor assembly configured to collect information about surroundings of a target creature to be recorded, and a battery coupler formed at one side of the main body, wherein the main body comprises:
        a first body configured to have a first buoyant material and at least one water inlet formed,
        a second body configured, together with the first body, to accommodate a main board provided with a controller and the sensor assembly, and coupled to the first body so as to form a streamlined body, and
        a ring-shaped base coupled to one side of each of the first body and the second body so as to prevent the first body and the second body from being separated from each other, and configured to accommodate a connecting board connected to the main board;
    an antenna configured to protrude in one direction from the main body so as to send data to outside;
    a battery case configured to have a male connector configured such that at least a part thereof is accommodated in the battery coupler so as to be rotatably coupled thereto, and a battery installed in the battery case so as to supply electrical energy to the main body; and
    a separation unit detachably coupled to the battery case and fixed to the target creature to be recorded.

2. The data collection apparatus according to claim 1, wherein the battery case comprises:
    an insert configured to serve as an inlet of an inner space of the battery case, and to have the male connector formed along an outer circumference of the insert;
    the battery accommodated in the battery case through the insert;
    a battery board coupled to the insert so as to be electrically connected to the battery and the controller; and
    a separation terminal formed at one end of the battery case opposite to the insert.

3. The data collection apparatus according to claim 2, wherein the battery board comprises:
    a first pogo pin connected to a first terminal of the battery; and
    a second pogo pin connected to a second terminal of the battery,
    wherein the first pogo pin and the second pogo pin are electrically connected to the connecting board.

4. The data collection apparatus according to claim 2, wherein:
    the separation terminal comprises coupling holes formed as through holes;
    the battery board comprises coupling fuses provided at positions thereof corresponding to the coupling holes; and
    the data collection apparatus further comprises a separation wire connected to the coupling fuses through the coupling holes in a state in which at least a part of the separation wire is coupled to the separation unit,
    wherein the separation wire is separated from the coupling fuses depending on predetermined conditions.

5. The data collection apparatus according to claim 4, wherein the battery board further comprises overvoltage generators configured to supply current to the coupling fuses when a predetermined signal is input from the controller, so as to separate the separation wire from the coupling fuses.

6. The data collection apparatus according to claim 1, wherein buoyancies of the first buoyant material and the second buoyant material are increased when the separation unit is separated from the battery case.

7. The data collection apparatus according to claim 1, wherein the main body comprises a mount groove formed along outer circumferences of the first body and the second body so that a strap may be mounted in the mount groove, wherein at least one sensing apparatus is coupled to the strap.

8. The data collection apparatus according to claim 1, wherein the separation unit is separated from the battery case when there is no change in a position of the target creature to be recorded for a predetermined period of time.

9. The data collection apparatus according to claim 1, wherein the separation unit is separated from the battery case when an amount of electrical energy stored in the battery is equal to or less than a predetermined value.

* * * * *